United States Patent [19]

Miller

[11] Patent Number: 4,681,212
[45] Date of Patent: Jul. 21, 1987

[54] ACCUMULATING CONVEYOR
[75] Inventor: Jack E. Miller, St. Clair Shores, Mich.
[73] Assignee: Harry Major Machine & Tool Co., Fraser, Mich.
[21] Appl. No.: 850,260
[22] Filed: Apr. 11, 1986

Related U.S. Application Data
[63] Continuation-in-part of Ser. No. 761,584, Aug. 1, 1985, Pat. No. 4,598,818.

[51] Int. Cl.$^4$ .............................................. B65G 17/00
[52] U.S. Cl. ................................ 198/803.2; 198/465.3
[58] Field of Search ............. 198/465.3, 465.1, 803.01, 198/803.2, 460; 29/33 P, 563

[56] References Cited
U.S. PATENT DOCUMENTS

| | | | |
|---|---|---|---|
| 3,319,765 | 5/1967 | Hasenwinkle et al. | 198/460 |
| 3,949,859 | 4/1976 | Nussbaumer et al. | 198/803.2 X |
| 4,062,444 | 12/1977 | Nakov et al. | 198/803.2 |
| 4,088,220 | 5/1978 | Jacksch et al. | 198/803.2 |
| 4,598,818 | 7/1986 | Miller | 198/803.2 |

Primary Examiner—Joseph E. Valenza
Assistant Examiner—Lyle Kimms
Attorney, Agent, or Firm—Basile, Weintraub & Hanlon

[57] ABSTRACT

An article carrier is supported upon a pair of endless roller chains for movement along an endless path having horizontal upper and lower runs extending between end sprockets of like radius. Inner and outer support plates are fixedly mounted upon the carrier at the inner and outer sides of the endless path and formed with opposed chain engaging edges including spaced parallel straight edge sections which upon a plurality of rollers to support the carrier and to frictionally couple the carrier to the chains when the carrier is on the upper or lowr run. The carrier is positively coupled to the chains during transit of the curved portions of the path defined by the sprocket by concave recesses at opposite ends of the straight edge section of the inner support plate in which rollers of the chain are seated and held by the tangential engagement of the straight edge of the opposed outer plate with a roller intermediate the seated rollers.

2 Claims, 5 Drawing Figures

ACCUMULATING CONVEYOR

REFERENCE TO RELATED APPLICATION

This application is a continuation-in-part of my copending application Ser. No. 761,584, filed Aug. 1, 1985, now U.S. Pat. No. 4,598,818.

BACKGROUND OF THE INVENTION

The accumulating conveyor of my application Ser. No. 761,584, now U.S. Pat. No. 4,598,818 employs a pair of multiple strand roller chains operatively trained about paired end sprockets for coordinated movement along an endless path having horizontal upper and lower ones extending between the end sprockets. Run strand of each roller chain is operatively trained about one set of end sprockets while a second strand of each chain is suppported laterally clear of the end sprockets and track means employed to support and guide the chains along their upper and lower runs. A plurality of article carriers are mounted to extend between the two chains and to be supported from the second strands of the chains by outer and inner support plates fixedly mounted at the opposite sides of each carrier. The outer support plates support the carriers upon the chains during transit of the upper run while the inner support plates suspend the carriers in an inverted position during transit of the lower run by the frictional engagement of chain engaging edges on the plates with the chain rollers. The chain is continuously driven and, because of the frictional coupling between the carriers and chains, carriers may be accumulated or held stationary by suitable stops at selected locations along either the upper or lower run.

To transfer carriers around the curved portions of the chain path defined by the end sprockets, the spacing and configuration of the opposed edges of the inner and outer support plates are designed to automatically positively couple the carrier to the chain as the carrier moves from the upper or lower run into the curved portions of the chain path.

The length of the straight edge section of the inner plate, its spacing from the opposed straight edge section of the outer plate, and the inclination of the beveled edge sections of the inner plate are related to the end sprocket radius and the pitch of the chain in a fashion such that when the carrier moves onto the curved portions of the endless path defined by the end sprockets, the corners at the junctures of the straight edge section and beveled edge sections of the inner plate project into the spaced between two adjacent rollers of the chain and are positively held in this position by the tangential engagement of the straight edge of the outer plate with a roller midway between those two sets of rollers engaged by the inner plate. This action provides a positive coupling between the carrier and the chain as the carrier transits the curved portions of the endless path so that the carriers can be transported from the lower run upwardly around one set of end sprockets to the upper run and be restricted to movement with the chain as the carrier is passed downwardly around the other end sprockets from the upper run to the lower run.

The driving or restraining force exerted by this coupling is exerted between the surface of a chain roller and the flat beveled edge surface of the inner plate which tangentially engages the surface of the roller at an angle such that only a relatively small extent of the beveled edge projects into the curved path of movement of the roller. The configuration of the support plates is designed on the assumption that the chain rollers will accurately follow the curved path defined by the end sprockets and in order to cooperate with the chain engaging edges of the support plates, the second strands of chain which these plates engage cannot directly engage the end sprockets. Further, adherence of the chain to the curved path defined by the sprockets requires the maintenance of a minimum chain tension. After prolonged usage, particularly where relatively heavy carriers are involved, distortion of the unsupported second strand of chain to the point where the coupling between the chain and carrier is lost during transit of the end sprockets has occurred.

The present invention overcomes this problem.

SUMMARY OF THE INVENTION

In accordance with the present invention, an inner support plate for a carrier of the type described above is formed with a chain engaging edge which includes a central straight edge section of a length sufficient to span three or more rollers of the chain. At each end of the inner plate, beveled end edge sections are inclined at an obtuse included angle from the straight edge section. Concave recesses are formed in the chain engaging edge of the inner plate at each of the opposite ends of the straight edge section and in each beveled edge section at locations such that during transit of the current portion of the endless chain path defined by the end sprockets, two non-adjacent pairs of rollers are respectively partially seated in the concave recesses just described and retained in the recesses during transit of the sprocket from the tangential engagement of the opposed support plate with a roller located midway between the pairs of rollers received in the recesses. The engagement of the rollers within recesses formed in the inner support plate effectively enables the inner support plate to project more deeply into the space between the adjacent rollers as the plate traverses the sprocket and further provides two points of driving or restraining engagement between the chain and support plate.

Other objects and features of the invention will become apparent by reference to the following specification and to the drawings.

Figure 1:
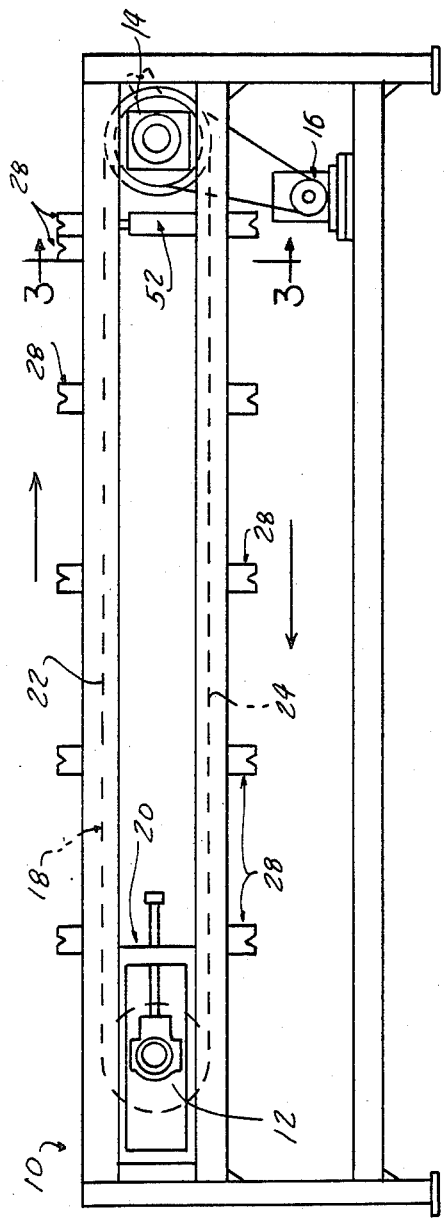
FIG. 1 is a side elevational view of an accumulating conveyor embodying the present invention.
Figure 2:
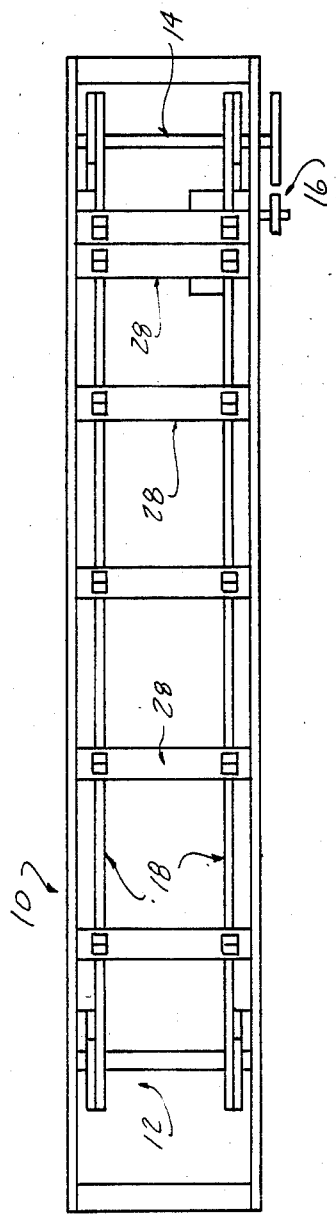
FIG. 2 is a top plan view of the conveyor of FIG. 1.
Figure 3:
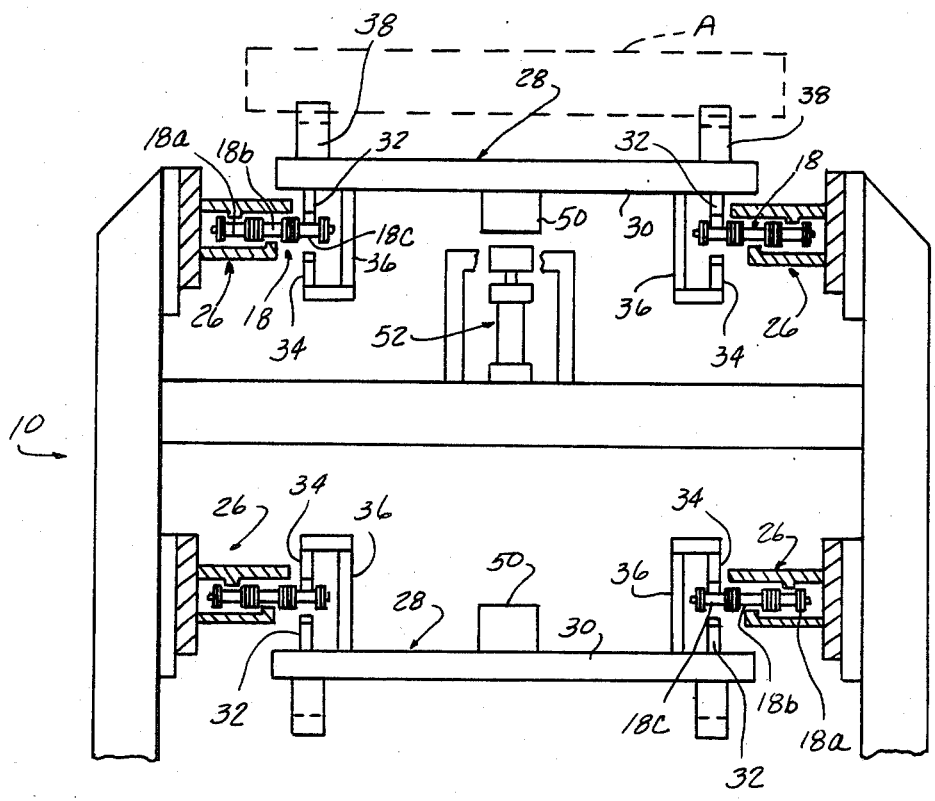
FIG. 3 is a detailed transverse cross-sectional view of the conveyor taken on line 3—3 of FIG. 1.

The overall arrangement of the accumulating conveyor shown in FIGS. 1-3 of the drawings is very similar to that disclosed in my aforementioned application Ser. No. 761,584. The conveyor includes a frame designated generally 10 upon which a rotatably mounted two paired sets of end sprockets 12 and 14, and sprockets 14 being coupled to a insertable drive means designated generally 16. The pair of endless multiple strand roller chains 18 are operatively trained about end sprocket sets 12 and 14 and are maintained in tension by a suitable chain tensioning device of conventional construction designated generally by 20 which is operatively coupled to end sprocket set 12. The sprocket of sprocket sets 12 and 14 are all of like radius and the chain 18 extend between sprocket sets 12 and 14 in horizontal upper and lower runs 22 and 24 located in FIG. 1.

Referring now to FIG. 3, it is seen that the multiple strand chains 18 take the form of a triple strand roller chain having strands 18a, 18b and 18c. The strands 18a and 18b are supported and guided in their movement along upper and lower runs 22 and 24 of the endless chain path by chain guiding tracks designated generally 26 which are fixedly mounted upon frame 10 of a conveyor to slidably receive and guide the strands 18a and 18b of the chain. Tracks 26 extend substantially the entire length of upper runs 22 and 24 but terminate short of the respective end sprockets. One or both of stands 18a and 18b are in mesh with the sprockets. The third strand 18c of the chain projects laterally clear of the tracks 26 and is likewise laterally offset from and does not engage any of the sprockets 12 or 14. Strands 18c are employed to support and convey article carriers designated generally 28 along the endless chain path.

Figure 4:
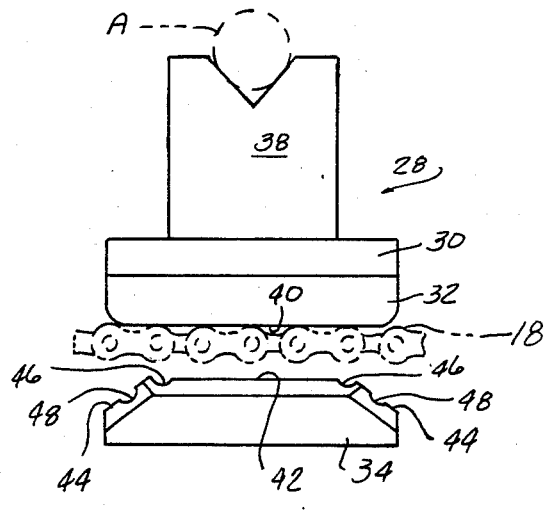
FIG. 4 is a detailed side elevational view of a carrier embodying the present invention.

Referring now particularly to FIGS. 3 and 4, each article carrier 28 includes a main frame member 30 which, as best seen in FIG. 3, extends transversely of the conveyor between the two chains 18. Outer support plates 32 are fixedly mounted upon frame member 30 adjacent each end of member 30 in vertical alignment with strand 18c of the respective chains and inner support plates 34 are likewise fixedly mounted upon frame member 30 adjacent each end of the frame member as by mounting brackets 36 to be vertically aligned with strands 18c of the chain and with the associated outer support plate 32. Article supporting cradles 38 are fixedly mounted on carrier frame member 30 and suitably conformed to support an article such as A indicated by broken line in FIGS. 3 and 4 upon the carrier.

Figure 5:
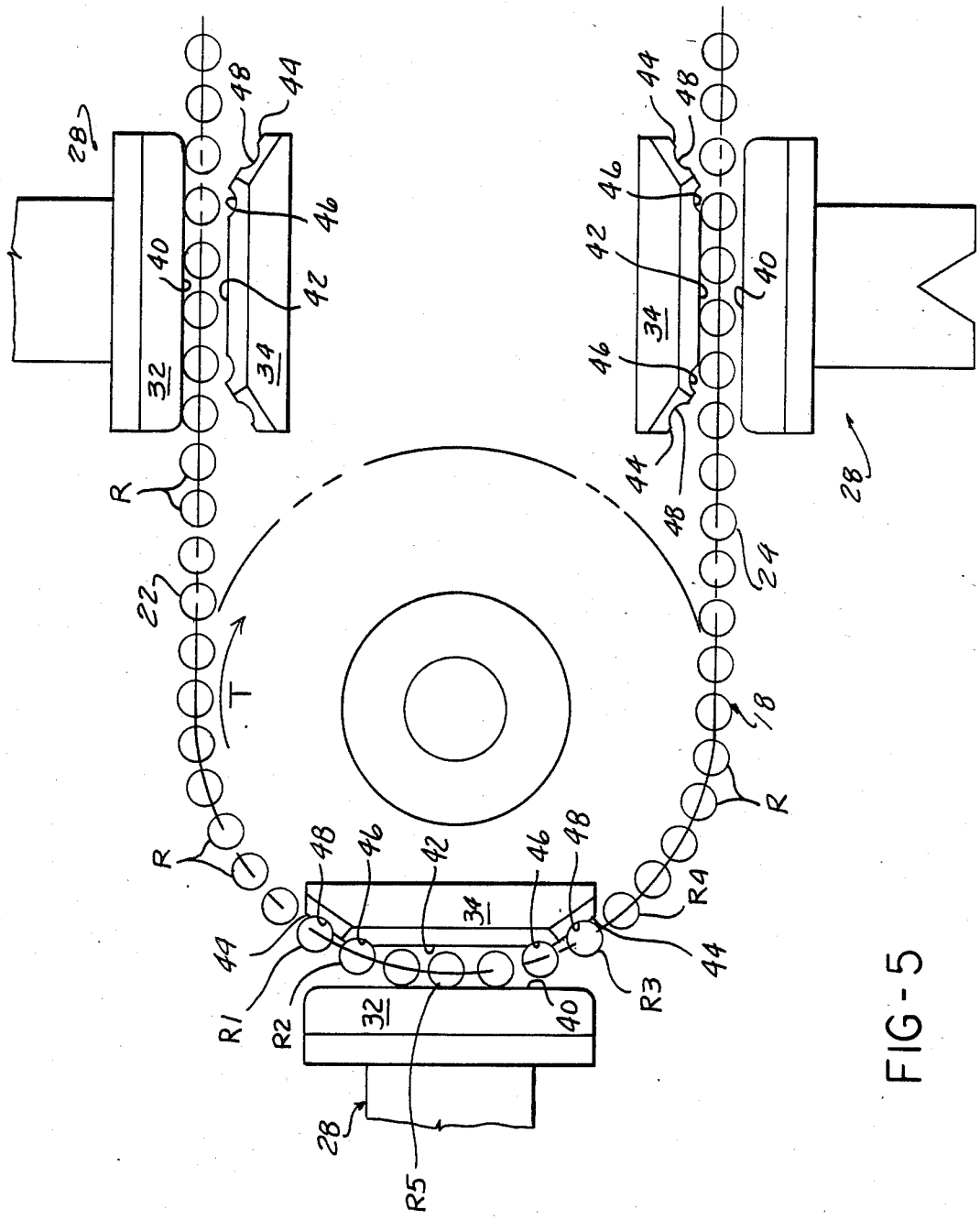
FIG. 5 is a schematic diagram showing the relationship between the carrier support plates and chain at various locations along the endless path of the chain.

Outer support plates 32 are formed with a straight chain engaging edge 40 (FIGS. 4 and 5) which is adapted to rest upon the rollers of strand 18c of chain 18 when the carrier is located upon the upper run of the chain path. As best seen in FIGS. 4 and 5, the length of the straight chain engaging edge 40 of outer support plate 32 is sufficient to span several rollers of chain 18 when on the upper run so that the carrier 28 is stably supported upon the chains. The precise length of the straight chain engaging end 40 of outer plates 32 is not critical, but for practical purposes should be long enough to engage at least three rollers of the chain when the carrier is on the upper run; that is the length of edge 40 will exceed three times the chain pitch.

Each of the inner support plates 34 is formed with a chain engaging edge which includes a central straight edge section 42 and inclined beveled edge sections 44 respectively located at the opposite ends of inner plate 34. A pair of concave recesses 46 are formed at opposite ends of straight edge section 42, while a second pair of concave recesses are formed respectively in the beveled edge end sections 44 as best seen in FIG. 4.

Referring now particularly to FIG. 5, it is seen that when a carrier 28 is located upon the upper run 22 of the chain path, the straight edge section 40 of outer support plate 42 rests upon a plurality of rollers R of the strand 18c of chain 18. For reasons which will become apparent, the fixed spacing between the opposed straight edge sections 40 and 42 of the outer plate 32 and inner plate 34 is greater than the diameter of rollers R of the chain and inner plate 34, thus inner plate 34 does not contact the chain at all when the carrier is on the upper run.

The weight of the carrier alone is sufficient to establish a frictional coupling between the outer support plate 32 and the rollers R of the chain which are engaged by the straight edge 40 and the movement of the chain will normally carry the carrier 28 along with the chain.

When it is desired to accumulate articles conveyed along the upper run of the conveyor, a stop designed generally 52 (FIGS. 1 and 3) is elevated to engage a stop plate 50 (FIG. 3) on a carrier and the carrier engaged by the stop is held stationary on the upper run of the chains 18 which continue to move, the rollers of the chain rolling along the straight edges 40 of the outer support plates. Carriers can thus be accumulated as desired.

Referring now to FIG. 5, when a carrier 28 is located on the lower run 24 of the chain, the straight edge section 42 of inner support plate 34 rests upon a plurality of rollers R to suspend the carrier in an inverted position from the lower run of the chain. Again, carriers on the lower run may either move with the chain or may be accumulated by the provision of a suitably located stop.

The present invention is primarily concerned with assuring a controlled driving movement of the carriers 28 as they pass around the sprockets between the upper and lower runs of the chain path.

In FIG. 5, it is seen that the spacing between the opposed straight edge sections 40 and 42 of the inner and outer support plates and the locations of the concave recesses 46 and 48 are related to the radius of the end sprockets and the pitch of the chain in a manner such that when the carrier is on a constant radius section of the endless path defined by an end sprocket, a first pair of adjacent rollers R1 and R2 are seated respectively in concave recesses 48 and 46 at one end of inner support plate 44 while a second pair of adjacent rollers R3 and R4 are respectively seated in the recesses 46 and 48 at the opposite end of the support plate 34. The rollers are retained in these recesses during transit of the sprocket by virtue of the tangential engagement of the straight edge section 40 of the outer support plate 42 with roller R5.

In the embodiment disclosed, the rollers R1, R2 are spaced behind roller R5 with respect to the direction of general travel of the chain indicated by the arrow T of FIG. 5, while the roller pair R3, R4 are spaced a corresponding distance forwardly from roller R5. In FIG. 5, a carrier 28 is shown moving downwardly around sprockets 14 from upper run 22 to lower run 24 and is being restrained in movement downwardly relative to the chain primarily by the engagement between a lower recesses 46, 48 and rollers R3, R4. In the case where the direction of travel as viewed in FIG. 5 were to be reversed so that the carrier was moving upwardly around the sprocket periphery, the primary driving force will again be derived from the engagement between rollers R3, R4 and the respective recesses 46 and 48. This driving force is derived not only from the interference between that portion of inner plate 34 which projects between rollers R3 and R4 but also from the interference between roller R3 and the upper end of recess 46.

While one embodiment has been described in detail, it will be apparent to those skilled in the art that the disclosed embodiment may be modified. Therefore, the foregoing construction is to be considered exemplary rather than limiting, and the true scope of the invention is that defined in the following claims.

What is claimed is:

1. For use in combination with an accumulating conveyor comprising a pair of like end sprocket means of like radius mounted for rotation about spaced, parallel, horizontal axes, an endless multiple-strand roller chain, at least one strand of said chain being operatively trained in tension about said end sprocket means, means for supporting and guiding said one strand of said chain along horizontal upper and lower runs extending between said sprocket means, a second strand of said chain being supported by said one strand laterally clear of said sprocket means and said means for supporting and guiding, and drive means for driving said chain in continuous movement along an endless path; an article carrier adapted to be mounted on said second strand of said chain, said carrier including mounting means mounted on the carrier and engaged with said second strand to support the carrier upon said second strand and operable to frictionally couple the carrier to said chain when the carrier is on the upper or lower run of the chain; said carrier including a frame and said mounting means comprising a rigid outer support plate and a rigid inner support plate fixedly mounted on said frame to be respectively located at the outer and inner side of the endless path of movement of said second strand, said support plates having opposed chain engaging edges including opposed straight edge sections extending a fixed, spaced, relationship to each other and spaced from each other by a distance greater than the diameter of the rollers of said chain, the straight edge section of said outer support plate having a length sufficient to span a plurality of rollers of said chain to stably support said carrier upon said second strand of said chain when said carrier is located on said upper run and the straight edge section of said inner plate having a length sufficient to span a plurality of rollers of said chain to stably support said carrier upon said second strand when said carrier is located on said lower run, said chain engaging edge of said inner plate terminating at opposite ends in beveled edge sections inclined from the straight edge section inwardly of said endless path at an obtuse included angle, the straight edge section of said inner plate terminating at each end in means defining a concave curved first recess formed to define a chain roller receiving seat, the length of said straight edge section of said inner plate being related to the radius of said sprocket means and the pitch of said chain such that during transit of said plates around the curved portions of said endless path defined by said end sprocket means two non-adjacent rollers of said second strand are respectively seated in said first recesses and the straight edge section of said outer plate being spaced from the straight edge section of said inner plate by a fixed distance such that during transit of said plate around said curved portions of said endless plate, the straight edge of said outer plate tangentially engages a roller of said second strand intermediate said two rollers to positively retain said two rollers seated within said first recesses to couple said carrier to said claim.

2. The invention defined in claim 1 wherein the chain engaging edge of inner plate further comprises means defining a concave second roller receiving recess in each beveled edge section spaced from the adjacent first recess to receive a roller of said second strand adjacent the roller received in said first recess when said carrier transits said curved portions of said path.

* * * * *

UNITED STATES PATENT AND TRADEMARK OFFICE
CERTIFICATE OF CORRECTION

PATENT NO. : 4,681,212
DATED : July 21, 1987
INVENTOR(S) : Jack E. Miller

It is certified that error appears in the above-identified patent and that said Letters Patent is hereby corrected as shown below:

Column 1, line 51, delete "spaced" and insert --space--.

Column 2, line 63, delete "sets" and insert --set--.

Column 2, line 64, delete "a".

Column 3, line 15, after "upper" insert --and lower--.

Column 3, line 16, delete "stands" and insert --strands--.

Column 3, line 47, delete "end" and insert --edge--.

Column 3, line 63, delete "42" and insert --32--.

Column 4, line 52, delete "a".

Signed and Sealed this

Twenty-second Day of March, 1988

*Attest:*

DONALD J. QUIGG

*Attesting Officer*   *Commissioner of Patents and Trademarks*